US010839142B2

(12) United States Patent
Barraclough et al.

(10) Patent No.: US 10,839,142 B2
(45) Date of Patent: Nov. 17, 2020

(54) MEDIA CONTENT DEVICE, SYSTEM AND METHOD

(71) Applicant: Apple Inc., Cupertino, CA (US)

(72) Inventors: Keith Barraclough, Mountain View, CA (US); David Irvine, San Jose, CA (US); John Logan, Long Beach, CA (US); Carlos Carapito, Fremont, CA (US); Abraham Rubin, Manassas, VA (US); Melanie Larson, Mountain View, CA (US); James Nathaniel Gerlach, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 805 days.

(21) Appl. No.: 14/632,245

(22) Filed: Feb. 26, 2015

(65) Prior Publication Data

US 2015/0199313 A1    Jul. 16, 2015

Related U.S. Application Data

(63) Continuation of application No. 13/474,432, filed on May 17, 2012, now Pat. No. 8,977,964, which is a (Continued)

(51) Int. Cl.
*G06F 17/22* (2006.01)
*G06F 21/62* (2013.01)
(Continued)

(52) U.S. Cl.
CPC ............. *G06F 40/149* (2020.01); *G06F 3/01* (2013.01); *G06F 21/62* (2013.01); *G06F 40/103* (2020.01);
(Continued)

(58) Field of Classification Search
CPC ............. G06F 17/211; G06F 17/2258; G06F 17/30569; G06F 17/30076;
(Continued)

(56) References Cited

U.S. PATENT DOCUMENTS 6,029,182 A   2/2000  Nehab et al.
6,199,082 B1* 3/2001  Ferrel ................. G06F 17/3089
                                                707/E17.005
(Continued)

FOREIGN PATENT DOCUMENTS

EP      1139253       4/2001
EP      1139253 A1    4/2001
(Continued)

OTHER PUBLICATIONS

Kon et al., "A New Digital Future for Publishers?", Oliver Wyman, Media Entertainment and Leisure, www.oliverwyman.com. Aug. 2010.
(Continued)

*Primary Examiner* — Sang H Kim
(74) *Attorney, Agent, or Firm* — Fletcher Yoder PC

(57) ABSTRACT

Access is provided for different types of media content provided by disparate publishers, and in formats corresponding to operating characteristics of respective user devices. As consistent with one or more example embodiments herein, media content access is filtered for users requesting access via different user devices, based upon characteristics of the device to which the access is provided, user subscription data and publisher-specific criteria. A user-specific storefront interface is generated for each of a multitude of users, based upon the filtering. Each storefront interface indicates media content that can be displayed at the device to which access is requested, and identifies media content to which the user does and does not have subscription access. The
(Continued)

user-specific storefront interfaces are presented at respective user devices, and media content is delivered to each device in response to selections made via the user-specific storefront interfaces.

20 Claims, 11 Drawing Sheets

Related U.S. Application Data continuation-in-part of application No. 13/415,157, filed on Mar. 8, 2012, now Pat. No. 8,978,149, and a continuation-in-part of application No. 13/439,665, filed on Apr. 4, 2012, now Pat. No. 9,274,694, which is a continuation-in-part of application No. 13/415,157, filed on Mar. 8, 2012, now Pat. No. 8,978,149.

(60) Provisional application No. 61/487,111, filed on May 17, 2011.

(51) Int. Cl.

| | | |
|---|---|---|
| *G06F 17/21* | (2006.01) | |
| *G06Q 30/04* | (2012.01) | |
| *G06Q 30/06* | (2012.01) | |
| *G06F 40/149* | (2020.01) | |
| *G06Q 30/02* | (2012.01) | |
| *G06F 40/14* | (2020.01) | |
| *G06F 40/103* | (2020.01) | |
| *G06F 3/01* | (2006.01) | |
| *G07F 17/20* | (2006.01) | |

(52) U.S. Cl.
CPC ......... *G06F 40/14* (2020.01); *G06Q 30/0258* (2013.01); *G06Q 30/04* (2013.01); *G06Q 30/0641* (2013.01); *G07F 17/20* (2013.01)

(58) Field of Classification Search
CPC ... G06F 17/30867; G06F 15/16; G06Q 10/00; G06Q 30/0641; G06Q 30/0258; G06Q 30/04

See application file for complete search history.

(56) References Cited

U.S. PATENT DOCUMENTS

| | | | |
|---|---|---|---|
| 6,336,124 B1* | 1/2002 | Alam | G06F 17/2229 |
| | | | 707/E17.006 |
| 6,397,231 B1 | 5/2002 | Salisbury | |
| 6,574,629 B1 | 6/2003 | Cooke et al. | |
| 7,076,534 B1 | 7/2006 | Cleron et al. | |
| 7,107,549 B2 | 9/2006 | Deaton et al. | |
| 7,827,180 B2 | 11/2010 | Achilles | |
| 7,908,358 B1 | 3/2011 | Prasad et al. | |
| 8,209,600 B1 | 6/2012 | Koh et al. | |
| 8,397,161 B1* | 3/2013 | Shah | G06F 40/154 |
| | | | 715/249 |
| 8,521,740 B2 | 8/2013 | Henderson et al. | |
| 8,977,964 B2 | 3/2015 | Barraclough et al. | |
| 8,978,149 B2* | 3/2015 | Barraclough | G06F 21/10 |
| | | | 705/14.55 |
| 2002/0035697 A1* | 3/2002 | McCurdy | G06F 17/30011 |
| | | | 726/3 |
| 2002/0091739 A1 | 7/2002 | Rodney et al. | |
| 2004/0003097 A1 | 1/2004 | Willis et al. | |
| 2004/0003351 A1 | 1/2004 | Sommerer et al. | |
| 2004/0054627 A1 | 3/2004 | Rugledge | |
| 2004/0199527 A1 | 10/2004 | Morain et al. | |
| 2005/0210412 A1 | 9/2005 | Matthews et al. | |
| 2006/0048043 A1 | 3/2006 | Kikuchi | |
| 2006/0106874 A1 | 5/2006 | Victor et al. | |
| 2006/0136449 A1 | 6/2006 | Parker et al. | |
| 2006/0190616 A1* | 8/2006 | Mayerhofer | H04L 67/20 |
| | | | 709/231 |
| 2006/0294051 A1 | 12/2006 | Kapadia et al. | |
| 2006/0294578 A1 | 12/2006 | Burke et al. | |
| 2007/0070442 A1 | 3/2007 | Ohkubo | |
| 2008/0109306 A1 | 5/2008 | Maigret et al. | |
| 2008/0195661 A1 | 8/2008 | Watson et al. | |
| 2009/0024698 A1 | 1/2009 | Ho et al. | |
| 2009/0030792 A1 | 1/2009 | Khivesara et al. | |
| 2009/0138357 A1* | 5/2009 | Riggs | G06Q 30/02 |
| | | | 705/14.52 |
| 2009/0216623 A1 | 8/2009 | Hendricks et al. | |
| 2009/0249217 A1 | 10/2009 | Chandrasekhar | |
| 2009/0259971 A1 | 10/2009 | Rankins et al. | |
| 2009/0265617 A1* | 10/2009 | Randall | H04N 21/440218 |
| | | | 715/249 |
| 2009/0319925 A1 | 12/2009 | Katinsky et al. | |
| 2010/0094878 A1 | 4/2010 | Soroca et al. | |
| 2010/0095337 A1 | 4/2010 | Dua | |
| 2010/0106702 A1 | 4/2010 | Strumpf et al. | |
| 2010/0146146 A1 | 6/2010 | Welts et al. | |
| 2010/0175090 A1 | 7/2010 | Cordray | |
| 2010/0325086 A1 | 12/2010 | Skinner et al. | |
| 2011/0072078 A1 | 3/2011 | Chai et al. | |
| 2011/0080843 A1 | 4/2011 | Casey et al. | |
| 2011/0099071 A1* | 4/2011 | Johnson | G06Q 30/02 |
| | | | 705/14.64 |
| 2011/0169860 A1 | 7/2011 | Ito | |
| 2011/0296291 A1 | 12/2011 | Melkinov et al. | |
| 2012/0078997 A1* | 3/2012 | Evans | G06Q 10/00 |
| | | | 709/203 |
| 2012/0079529 A1* | 3/2012 | Harris | H04N 21/4755 |
| | | | 725/32 |
| 2012/0147055 A1 | 6/2012 | Pallakoff et al. | |
| 2012/0197998 A1 | 8/2012 | Kessel et al. | |
| 2012/0210207 A1 | 8/2012 | Boss et al. | |
| 2012/0278725 A1 | 11/2012 | Gordon et al. | |
| 2012/0284290 A1 | 11/2012 | Keebler et al. | |
| 2012/0297302 A1 | 11/2012 | Barraclough et al. | |
| 2012/0317482 A1* | 12/2012 | Barraclough | G06F 3/01 |
| | | | 715/716 |
| 2013/0024757 A1* | 1/2013 | Doll | G06F 17/212 |
| | | | 715/204 |
| 2013/0081083 A1 | 3/2013 | Yu et al. | |
| 2013/0198602 A1 | 8/2013 | Kokemohr | |
| 2014/0245133 A1* | 8/2014 | McCoy | G06F 40/106 |
| | | | 715/236 |
| 2014/0337322 A1 | 11/2014 | Cho et al. | |
| 2014/0365851 A1 | 12/2014 | Kroupa et al. | |

FOREIGN PATENT DOCUMENTS

| | | |
|---|---|---|
| EP | 1278364 | 1/2003 |
| EP | 2823428 | 1/2015 |
| NO | 2012158951 A1 | 11/2012 |
| WO | 2008097624 | 10/2008 |
| WO | 2012018359 | 2/2012 |
| WO | 2012134549 | 10/2012 |
| WO | 2012158951 | 11/2012 |

OTHER PUBLICATIONS

Supplementary European Search Report for Application No. EP 12785780, dated Mar. 2, 2015.
"Cloud Mobile Media: Reflections and Outlook", Wen et al., IEEE Transactions on Multimedia, vol. 16, No. 4, pp. 885-902, Jun. 2014.
Story, G. A. et al, "The Right pp. Image-Based Electronic Library for Alerting and Browsing," Computer, IEEE, vol. 25, No. 9 (Sep. 1992), pp. 17-25.
EPO Supplementary Search Report, counterpart European Patent Application No. 15871226.5 (dated May 7, 2018), 2 pgs.
Chorianopoulos et al. "Cross Media Digital Rights Management for Online Stores" [online]. In: Proceedings of the First Int'l Conference on Automated Production of Cross Media Content for Multi-Channel Distribution 2005.
EPO Extended Search Report, counterpart European Patent Application No. 13757704.5 (dated Oct. 16, 2015), 2 pgs.

(56) References Cited

OTHER PUBLICATIONS

Hisashi Miyashita et al.; May 2007; W4A '07: Proceedings of the 2007 international cross-disciplinary conference on Web accessiblity (W4A); Publisher: ACM; pp. 126-127.

Kon M. et al., "A New Digital Future for Publishers?", Oliver Wyman, Media Entertainment and Leisure, www.oliverwyman.com. Aug. 2010.

Romil Bansal, et al.; "TWIPIX; a web magazine curated from social media"; Oct. 2012; MM '12: Proceedings of the 20th ACM international conference on Multimedia; Publisher: ACM; pp. 1355-1356.

Sathish. "Delivery Context Access for the Mobile Web" [online]. Dated May 2007. Retrieved at: http://tutkielmat.uta.fi/pdf/lisuri00064.pdf.

Story, G. A. et al, "The Right Pages Image-Based Electronic Library for Alerting and Browsing," Computer, IEEE, vol. 25, No. 9 (Sep. 1992), pp. 17-25.

Yonggang Wen, et al.; "Cloud Mobile Media: Reflections and Outlook"; Multimedia, IEEE Transactions on vol. 16, Issue: 4; DOI: 10.1109/TMM.2014.2315596; Jun. 2014; pp. 885-902.

* cited by examiner

FIG. 2 - continued
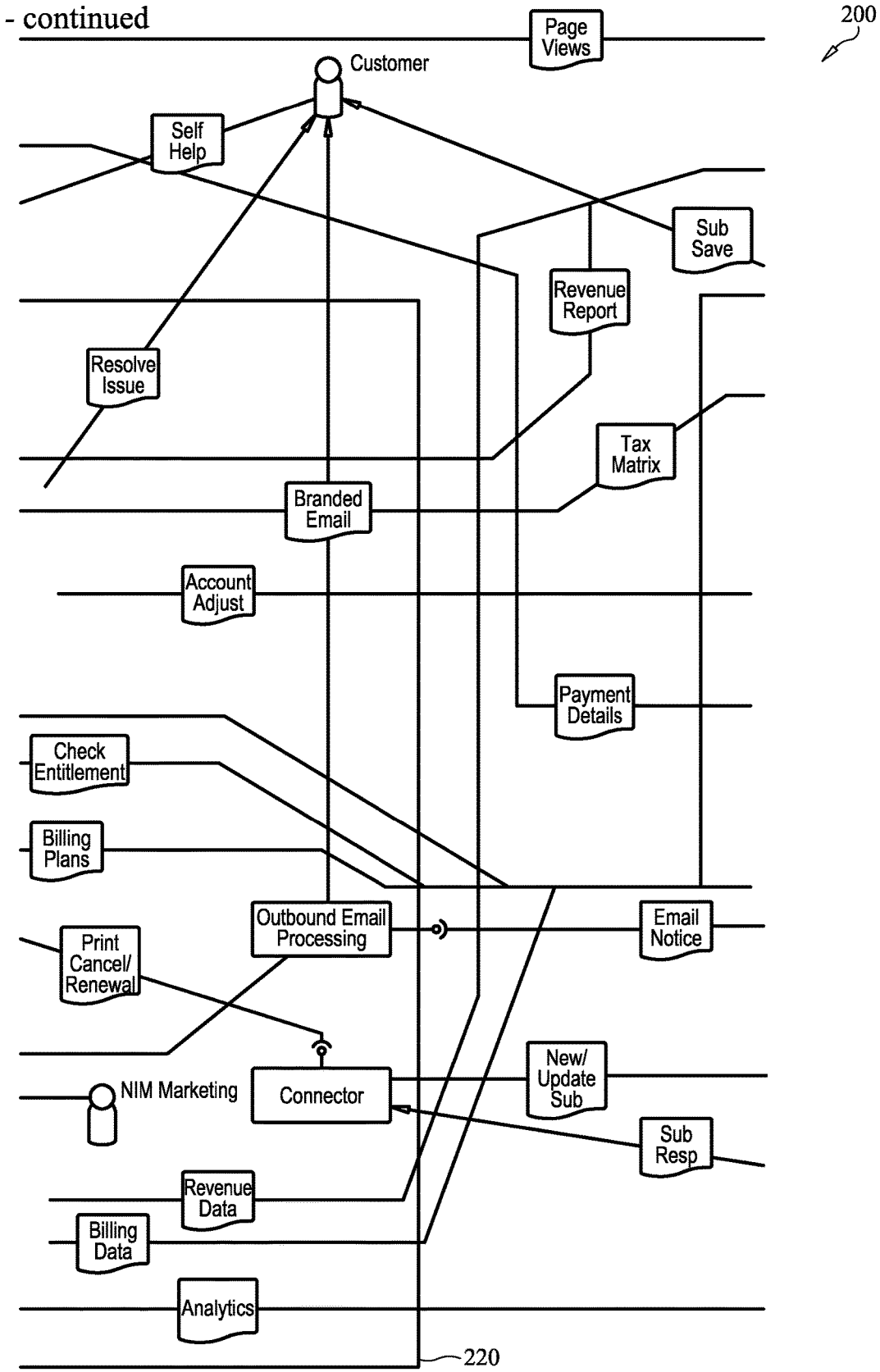

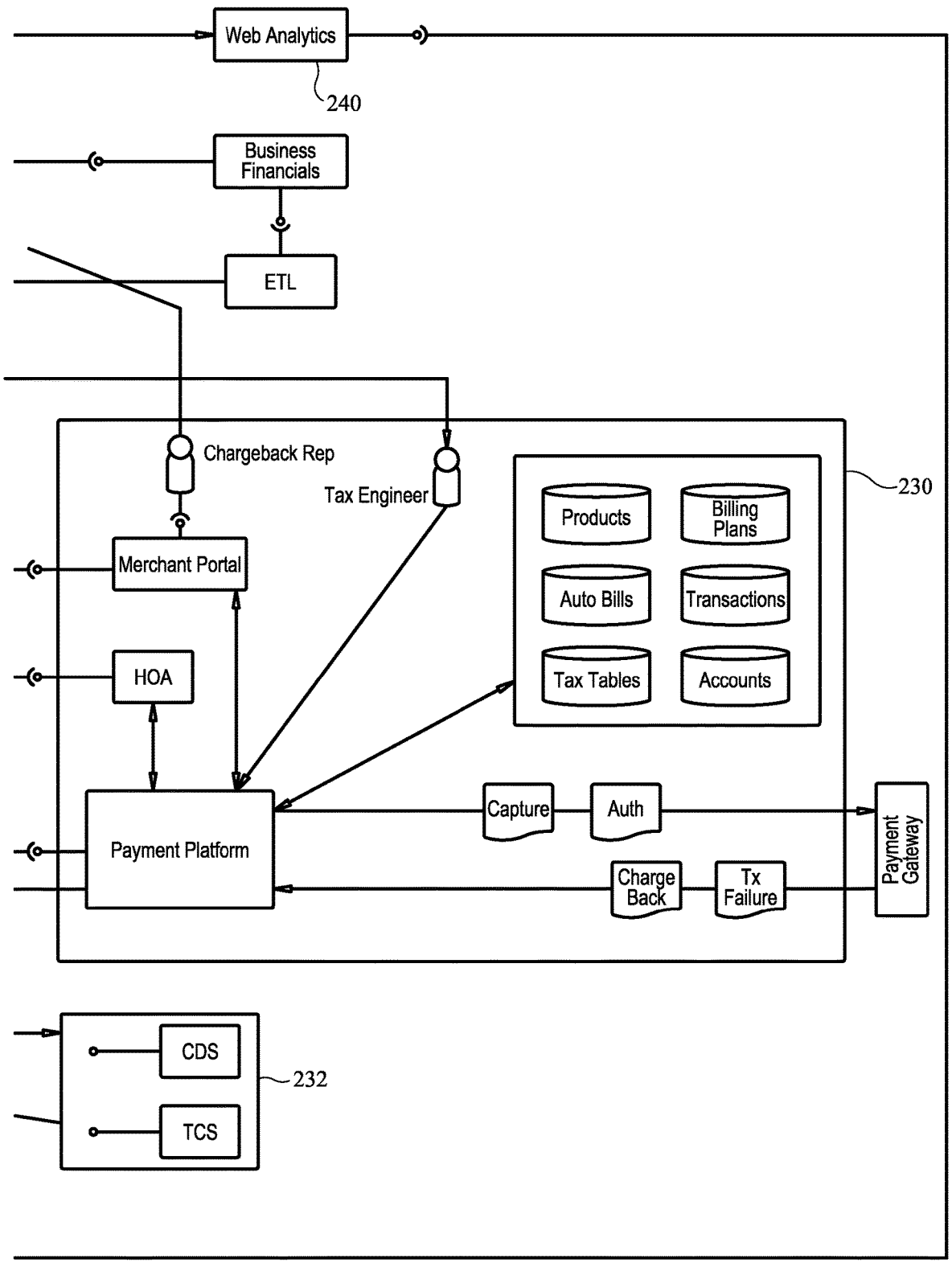
FIG. 2 - continued

MEDIA CONTENT DEVICE, SYSTEM AND METHOD

RELATED PATENT DOCUMENTS

This patent document is a continuation of U.S. patent application Ser. No. 13/474,432 filed on May 17, 2012 (U.S. Pat. No. 8,977,964), which claims the benefit under 35 U.S.C. § 119 of U.S. Provisional Patent Application Ser. No. 61/487,111 filed on May 17, 2011; Ser. No. 13/474,432 is further a continuation-in-part under 35 U.S.C. § 120 of U.S. patent application Ser. No. 13/415,157 (filed on Mar. 8, 2012) and Ser. No. 13/439,665 (filed on Apr. 4, 2012); all of these documents, including the Appendix filed in the underlying provisional application, are fully incorporated herein by reference.

BACKGROUND

Many media categories, such as music, home video, books, and television, have been substantially impacted by the advent of digital distribution, creating significant growth opportunities for some but painful value erosion for many others. Typically, we have seen value migrate from media incumbents to device makers and global internet players. Now, with the growth of e-readers and tablets such as the Kindle and the iPad, will the magazine and newspaper publishing industry suffer the same fate?

To date, the availability of free content on the internet has diluted content providers' (e.g., publishers) ability to sell print products. That has contributed to print advertising declines, and online advertising has not made up for the loss. Some industry observers foresee a continuing and inevitable slow decline in revenues, based on value migration to tech players, similar to the decline in other media sectors. However, others believe that the industry has a chance to renew subscription revenue growth through product and business model innovation, such as the development of interactive periodicals.

SUMMARY

Aspects of the present disclosure are directed to presenting media content to users, such as via mobile devices, stand-alone computers, mobile computer, televisions and navigation systems.

In connection with various example embodiments, media content pertains to subscription-type content, as may be associated with one or more of a variety of content sources. Available content types and/or subscription types are provided to users via an interface, from which content can be accessed. Various embodiments are directed to the control of content access based upon attributes of one or more of a user attempting to access the content, an owner of the content and characteristics of one or more of a device and system used to access the content. In some implementations, the content pertains to a digital or print-type magazine that offers the content to subscribers, who are provided access as discussed herein.

Other example embodiments are directed to an apparatus for presenting and facilitating access to media content from disparate content providers and in disparate formats, at user devices having different format type criteria. The apparatus includes a media content formatter, respective filters, a storefront formatting engine and an interface module. The media content formatter formats different types of media content from the disparate content providers into a plurality of common format types based upon formatting criteria defined for each of the disparate content providers. Each common formatting type corresponds to specific electronic interface characteristics for one of a plurality of disparate device types via which the media content is to be presented in one of the common format types. A first one of the filters operates to filter media content access based upon characteristics of a device to which the access is provided, a second filter operates to filter media content access based upon stored time-based subscription data for a user identification associated with a content access request, and a third filter operates to filter media content access based upon access criteria specific to each of the disparate content providers for which the media content is provided. The storefront formatting engine generates and formats a user-specific storefront interface using the first, second and third filters, for each of a multitude of users each having a unique one of the user identifications. Each generated storefront interface indicates media content that is available for access by the user based upon: characteristics of the device via which the user is to access the media content, subscription data for the user and criteria set by the respective content providers for the respective media content, the storefront interface identifying media content to which the user has subscription access and media content to which the user does not have subscription access. The interface module responds to requests for accessing media content received from a multitude of disparate devices, presents data in the request to facilitate the presentation of a user identification for each user to the second filter, and communicates data for presenting the user-specific storefront interface generated at the formatting engine for each specific device and the specific user identification of the user of the device. The interface module further facilitates the delivery of stored media content to each device via which the user-specific storefront interface is provided, based on user-selections made via the user-specific storefront interface.

Another embodiment is directed to a method for presenting and facilitating access to media content from disparate content providers and in disparate formats, at user devices having different format type criteria. Different types of the media content from the disparate content providers are formatted into two or more common format types, based upon formatting criteria defined for each of the disparate content providers. Each common formatting type corresponds to specific electronic interface characteristics for one of a plurality of disparate device types via which the media content is to be presented in one of the common format types. Media content access is filtered based upon characteristics of a device to which the access is provided, stored time-based subscription data for a user identification associated with a content access request, and access criteria specific to each of the disparate content providers for which the media content is provided. For each of a multitude of users each having a unique one of the user identifications, a user-specific storefront interface is generated and formatted using the first, second and third filters, each storefront interface indicating media content that is available for access by the user based upon: characteristics of the device via which the user is to access the media content and subscription data for the user and criteria set by the respective content providers for the respective media content. The storefront interface identifies media content to which the user has subscription access and media content to which the user does not have subscription access. In response to requests for accessing media content received from a multitude of disparate devices, data in the request is presented to facilitate the presentation of a user identification for each user and for filtering the media content access based upon the stored time-based subscription data. Data is communicated for presenting the user-specific storefront interface generated at the formatting engine for the specific device and the specific user identification of the user of the device, and stored media content is delivered to each device from which selections are received via the user-specific storefront interface provided to the device.

Another embodiment is directed to an apparatus having filtering, storefront interface and communication modules executable to carry out respective operations and activities for presenting and facilitating access to media content for disparate publishers and in disparate formats, at user devices having different format type criteria. The filtering module filters media content access for each user requesting access via one of the user devices, based upon characteristics of the device to which the access is provided, upon time-based subscription data for a user identification associated with a content access request, and upon criteria specific to each of the disparate publishers on behalf of which the media content is provided. Filter data identifying media content that can be presented at each of the respective user devices based on these criterion is provided and used at the storefront interface module to generate a user-specific storefront interface for each of a multitude of users each having a user identification. Each storefront interface indicates media content that can be displayed at the device to which access is requested, and identifies media content to which the user has subscription access and media content to which the user does not have subscription access. The communication module communicates data to each user device for presenting the user-specific storefront interfaces thereat, and responds to user-selections made via the user-specific storefront interface by facilitating the delivery of stored media content to the device via which the user-specific storefront interface is provided.

The above summary is not intended to describe each embodiment or every implementation of the present invention. The figures and detailed description that follow more particularly exemplify various embodiments.

FIGURES

One or more embodiments of the present disclosure may be more completely understood in consideration of the detailed description and in connection with the drawings, in which FIG. 1 shows an apparatus for configuring and providing media content, in accordance with an example embodiment of the present invention;

Figure 1:
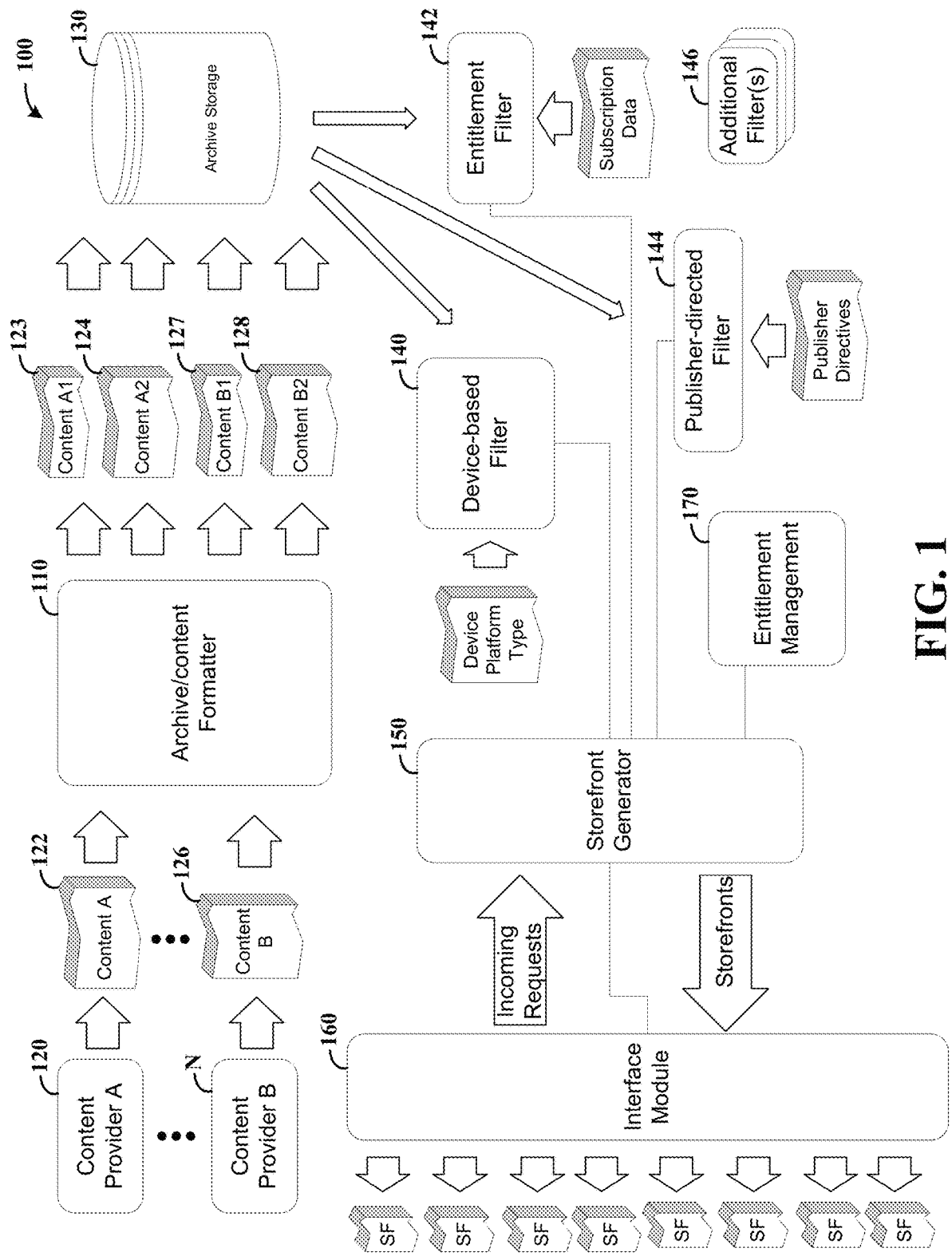

While the disclosure is amenable to various modifications and alternative forms, specifics thereof have been shown by way of example in the drawings. It should be understood, however, that the intention is not to limit the disclosure to the particular embodiments shown and/or described. On the contrary, the intention is to cover all modifications, equivalents, and alternatives falling within the scope of the present disclosure.

DETAILED DESCRIPTION

The present disclosure relates to media content, delivery and presentation, as well as circuits, devices and systems as described herein. While the present disclosure is not necessarily limited, aspects of the disclosure may be appreciated through a discussion of examples using these and other contexts. The following discussion describes various exemplary embodiments without limitation to other related embodiments and/or subject matter herein.

Various example embodiments are directed to the presentation of a storefront-type system using an interactive circuit via which users are presented with access to media content, and user selections/subscriptions are used in presenting the content. User entitlement to media is used to present media to the user, with subscription and payment information provided and implemented to establish, add or extend such entitlement.

In connection with other embodiments, access is provided for different types of media content provided by disparate publishers, and in formats corresponding to operating characteristics of respective user devices. This approach facilitates the communication of electronic information that can be used to generate image data corresponding to the media content provided by different publishers (e.g., and often in different formats from each publisher). These and other aspects are directed to addressing challenges and problems relating to providing such access in an efficient and responsive manner, and to doing so via a multitude of disparate device platforms, such as may be applicable to mobile/portable devices having different operating platforms and different display sizes.

In a particular embodiment, access to media content is filtered (e.g., tailored or restricted) based upon characteristics of devices to which the access is to be provided, upon user subscription data, and further upon publisher-specific criteria (e.g., specifying device types/characteristics to which the publisher allows content access). A user-specific storefront interface is generated for each of a multitude of users, based upon the filtering and available media content (e.g., from a catalogue of media content available for purchase/access). Each storefront interface indicates a subset of the media content that can be displayed at the device to which access is requested, and identifies media content to which the user does and does not have subscription access. In this context, the respective storefronts are tailored for each user, based upon the user's subscription or entitlement rights to media content, characteristics of the device that the user is employing to access the content, and publisher-specific criteria. Certain embodiments involve further tailoring the respective storefronts, such as to reflect local or remote availability of content to which access can be provided, and to offer storage options such as for deleting/removing data for accessed content, downloading content, subscribing to additional content, and more. Accordingly, these user-specific storefront interfaces are presented at respective user devices to which media content is delivered based on selections made via the interfaces.

Other embodiments are directed to an apparatus having a plurality of circuit-based modules including a content-attribution module, a storefront module and a provisioning module. The content-attribution module includes access entitlement data identifying a multitude of user identification codes, each user identification code being associated with a subscribing user and at least one of a plurality of sets of media content to which the user has a subscription. The storefront module generates user-specific interface data for each of a multitude of users and a multitude of different sets of media content, based upon an association of the identification code for that user with one or more sets of media content, and based upon attributes of a mobile device via which the user accesses the interface data. The user-specific interface data includes data for displaying images identifying media content that is associated with the identification code and media content that is not associated with the identification code, in a manner that differentiates the media content that is associated with the identification code from the media content that is not associated with the identification code. The generated user-specific interface data for each user is communicated to that user's mobile device in response to a storefront access request received from the mobile device. The provisioning module provides content for access by a user at a portable device, responsive to selection data transmitted from the mobile device and including at least an aspect of the generated data communicated to the mobile device by the second circuit-based module.

In various embodiments, a host system facilitates cross-title interactive media content access, as may be implemented with the above-discussed approaches, to deliver media content that can be presented at a variety of different types of display devices. Various implementations are directed to the delivery of digital magazine content that can be accessed via tablet, smartphones, desktop/laptop computers, TVs and other electronic devices. Digital magazine content can be provided via subscription, single item purchase and upgrade/discount bundling with other physical goods such as existing print magazine subscriptions.

In some implementations, dynamic offer management functions are effected via cross title usage, interest and sales, to tailor offers to specific users or specific types of users. Offers may be rotated based on time, recommendation or other external events. Magazines, applications and special offers can be delivered through a storefront application type system as presented to a user via electronic devices. Sales can be made as a part of a subscription, bundle or single item using the user's system account.

In various implementations, a personalized storefront and/or media reader is presented to a user based upon the users login and account information, which identifies the user, and other information (e.g., tracked history) if available. Personalization can also be carried out to control the manner in which information is provided to a user. For instance, if a user reads certain sections or articles of a particular magazine first on a recurring basis, a reader presented to the user can provide these sections first, and can further prioritize these sections (e.g., by downloading these sections before others, unless a user specifically selects another section). Such a download approach may, for example, involve providing a contents page first to facilitate user review. Tracking may include, for example, tracking a user's use as well as history of purchases across all devices linked to the user's account, for tailoring the storefront and display as well as providing advertising. This tracking can be further saved with subscribing user profiles, and accessed to present information to a user.

Certain embodiments are directed to a reader application that communicates for displaying user-specific storefront interfaces and accessing displayed content as discussed herein. In some instances, the reader application includes an application that presents the storefront interface. This presentation may involve, for example, displaying content available for purchase or to which the user is already entitled to access. In certain implementations, the reader application launches an out of application presentation of the storefront in a separate process, such as by launching a storefront-specific application or a web browser application for the storefront. A library user interface view is presented to display all media content (e.g., issues) the user is entitled to along with a status of the media content such as whether or not the content is resident on the device or a downloading progress.

In some instances, as purchases are made, an entitlement record is created in an entitlement database. An entitlement grants access rights for a given user to access a given piece of content. For delivering media content, a download service consults the entitlement database when handling download requests from reader applications (e.g., via user-specific interface data presented thereat). If the user is entitled to a requested piece of content, the address of the content in the content store is returned to the user device, which the reader application uses to begin downloading the content. The address points to an appropriate rendition of the content based on type of device the user is attempting to perform the download on (e.g., in accordance with a filter with respect to device capabilities and stored data compatibility therewith).

Media content such as magazines may be grouped into subject, style and/or type, to provide recommendations to users based upon the groupings. A unified magazine reading environment can be provided to facilitate such grouping.

In some embodiments, media content access is shared among users and/or devices. For example, excerpts of magazine issues can be selected and provided for access by others, with the access controlled by the system. This shared-user access can be further provided with various advertising information, such as information for purchasing a magazine from which content was shared.

Sharing, marketing and usage data can be gathered and processed to provide information and/or services to media content providers and/or other business stakeholders. For example, usage of a particular reader can be used to tailor the type of content, the manner in which content is provided and/or other characteristics. Similarly, use patterns for particular media content, such as the manner in which a user reads a digital magazine, can also be used to provide such services.

Cross-platform cross-device sales and content delivery of the magazines are facilitated as well, to provide user's access to content on various device types. For example, a user may have an entitlement granting him/her access to a digital magazine. That user may access the magazine using different devices, such as a laptop computer and a smart phone type of handheld device. Each of these devices may operate on different platforms. In this context, access is provided to the user, via offerings tailored to the specific devices and platforms. For example, different types of content may be provided based upon the device type, and capabilities of the device, or as related to the capabilities of the device's connectivity to receive content.

Complimentary media and other communications for the media content brands offered in the store are also provided, in accordance with various embodiments. Different content is delivered to different canvasses (e.g., television, tablet, computer), which can be consumed on individual devices or in multi-screen modes in which complementary content and a user interface (UI) can exist. For instance, related content can be simultaneously provided on a user's tablet and on a television that the user is interacting with. Such examples may involve, for example, providing embedded images for display on a television while a user is reading text on a tablet. Another example involves providing linked text when other media content, such as audio or video, is being provided (e.g., display information regarding music as it is being played, or display information regarding a movie as the movie is being watched).

Costs are managed and processed in a variety of manners. In some embodiments, delivery costs such as may pertain to rich content (e.g., higher bandwidth) are tracked and charged back to one or both of a content provider and a user. Other content delivery costs, such as those that may pertain to management of the delivery, are also tracked and charged accordingly.

Other embodiments are directed to search functions for searching media content, such as magazine content, to which a user is entitled access and/or to content that the user is not entitled access (e.g., until purchased). For example, a user wishing to read articles about a certain topic can search for the topic, browse results and choose results to view/read. For search results including articles that the user is entitled to view (via profile/subscription data), access is provided. For search results including articles that the user is not entitled to view, access can be provided using a purchase-type of approach. These search features can be tailored/limited to the user's entitlement as well, such as by limiting the search to a particular magazine title or titles and issue(s), to which the user is entitled to view.

Various other embodiments are directed to a publisher portal system that provides system access to publishers making media content available to users. The publisher portal is configured to provide access to the publisher for tailoring the display of media content to suit particular needs, such as to tailor the content for users or groups of users, particular titles, or type of media.

Further aspects of the present disclosure are directed to internet-based periodical publishing systems and/or approaches involving display upon color, touch-enabled, portable devices that facilitate unique user-specific interaction. Such devices include, for example, application-specific, media-related devices such as digital music players, e-readers, media tablets and touch netbooks. In various instances, payment for the periodicals is effected in connection with electronic communications for the delivery thereof, streamlining the process.

Turning now to the Figures, FIG. 1 shows an apparatus 100 for configuring and providing media content, in accordance with an example embodiment of the present invention. The apparatus includes a media content formatter 110 that formats different types of the media content from disparate content providers 120-N into a plurality of common format types based upon formatting criteria defined for each of the disparate content providers. In some implementations, the content providers are publishers as shown by way of example. In other implementations, an aggregator provides the content, with the aggregator providing content on behalf of multiple publishers.

By way of example, separate sets of media content 122 and 126 are shown as respectively being provided from content provider 120 and N in different formats, and each set is reformatted into two different content types as reformatted content 123 and 124 from content 122, and reformatted content 127 and 128 from content 126. Reformatted content 123 and 127 are of a common format, and reformatted content 124 and 128 are of a common format, with each of the respective common formats being different than the original format of content 122 and 126. The reformatted content type corresponds to specific electronic interface characteristics for disparate device types via which the media content is to be presented. The reformatted content is stored in a content archive 130, and in some implementations, the original media content is also stored for use in reformatting to other format types at a different time. For example, at least one of text data, image data, audio data and video data may be transcoded into a format amenable for processing by the specific device type. Such formatting or transcoding can be optimized to each device class to be supported, such as for a laptop, netbook, touchscreen, smartphone, media tablet, any one device, or all devices, and for one or more different operating platforms implemented at each device.

The system also includes first, second and third filters 140, 142 and 144. The first filter 140 filters media content access based upon characteristics of a device to which the access is provided. For instance, certain devices may simply be incapable of presenting certain types of media content, such as embedded video within text-based content. Other devices may have different types of display characteristics, use different platforms (e.g., different audio or video codecs) or require other formatting that may be unique to the particular device or platform type. The first filter accordingly filters content with respect to identifying content for user access from a specific device according to this criteria and data specifying a content type.

The second filter 142 filters media content access based upon stored time-based subscription data for a user identification associated with a content access request. This time-based subscription data may, for example, pertain to a single item purchase that a user makes via a presented storefront (discussed below), or to a multiple-issue subscription as may be applicable, for example, to a cyclic subscription to a periodical. In this context, time-based subscription data may pertain to such a time schedule pertaining to the cyclic subscription, or to the purchase of access to a single issue that may be accessed over time (e.g., a user may download a purchased issue or part of the issue, delete it and then download again). In some implementations, the second filter 142 accesses external time-based subscription data and synchronizes stored time-based subscription data with the external time-based subscription data.

The third filter 144 filters media content access based upon access criteria specific to each of the disparate content providers for which the media content is provided. This criteria may, for example, pertain to content provider rules with regard to the placement of advertising image data with text (e.g., for instances in which the advertising image is dynamic relative to a static text page), or other formatting/arrangement type relationships. Other rules may pertain to size, such as display size as could be relevant to different types of devices via which a user may access the content (e.g., a hand-held phone having a 2.5" display, relative to a tablet type device having a 7" display).

A storefront formatting engine 150 generates and formats a user-specific storefront interface using the first, second and third filters, for each of a multitude of users each having a unique one of the user identifications. Each storefront interface indicates media content that is available for access by the user based upon: characteristics of the device via which the user is to access the media content, subscription data for the user and criteria set by the respective content providers for the respective media content, the storefront interface identifying media content to which the user has subscription access and media content to which the user does not have subscription access.

An interface module 160 responds to requests for accessing media content received from a multitude of disparate devices by presenting data in the request to the second filter 142 to facilitate the presentation of a user identification for each user. For each of the multitude of disparate devices, the interface module 160 communicates data for presenting the user-specific storefront interface generated at the formatting engine for the specific device and the specific user identification of the user of the device. For user-selections made via the user-specific storefront interface, the interface module 160 further facilitates the delivery of stored media content to the device via which the user-specific storefront interface is provided.

In some embodiments, the storefront formatting engine 150 generates and formats each user-specific storefront interface using the filters as follows. The first filter 140 is used to identify media content that can be accessed via a device at which the access is requested, based upon electronic interface characteristics of the device. The second filter 142 is used to identify media content to which the user is entitled to access as identified by subscription data for the user, and to generate data that identify available media content that the device is capable of displaying but for which the user does not have subscription entitlement. The third filter 144 is used to restrict the inclusion of media content provided by content providers based upon publisher-specified criteria defining device types upon which the publisher's media content is not to be displayed. Using this approach, a user-specific storefront interface is generated and used to display media content from a content catalog that the user's device is capable of displaying. The media content is that content which the respective content providers providing the content allow to be displayed on the type of the user's device, and which visually identifies content to which the user has subscription entitlement and content to which the user does not have subscription entitlement. In some implementations, this visual identification signifies different flat rate subscription types (e.g., basic and premium), each of which cover different sets of media content (e.g., periodical titles). When a user selects content to which a subscription is not active, an entitlement engine/system is invoked to facilitate access (e.g., to assess a fee to the user requesting access to the content). Such an entitlement system may be implemented as an entitlement management module 170 (discussed below) with the system 100 or otherwise externally thereto (and as may be consistent with other embodiments herein).

In certain embodiments, a reader device (e.g., at a user's tablet) includes a user interface storing library information for downloaded content, and inputs for selecting content a user would like to have downloaded, and provides indication of such content using one or more of the filters. In some implementations, the reader device uses a filter to identify content that is available (downloaded) at the device, presents a delete option for removing the downloaded content, and that identifies content that has not been downloaded but is available via a download option.

In connection with FIG. 1 and one or more embodiments, the apparatus 100 also includes a fourth filter as one of one or more additional filter(s) 146, which identifies media content that complies with each of the first, second and third filters and is stored at a user's device, relative to other media content that complies with the first, second and third filters but is not stored at the user's device. This approach can be used in connection with the above discussion, and presentation at a reader device, and with the apparatus 100. Specifically, the storefront formatting engine 150 generates and formats each user-specific storefront interface by generating interface data that visually identifies the first media content relative to the second media content, presents a delete option for the first media content, and presents a download option for the second media content.

In a more particular embodiment, a fifth additional filter (at 146) identifies media content based on a user-provided search input and that complies with the first, second and third filters. For instance, when a user interacts via the interface 160 to present a search request for a search term such as "rugby," the fifth additional filter also filters available reformatted content at the archive storage 130 to generate and present a storefront to the user that reflects this filter (e.g., media content pertaining to the term "rugby") as well as complies with the other filters with respect to subscription, device type and publisher requirements. This fifth additional filter may also be implemented with the above-discussed fourth additional filter, characterizing the content. The storefront formatting engine 150 uses the fifth filter in generating and formatting the user-specific storefront interface based on the search term.

Access is provided to a variety of different types of media content, using various embodiments as discussed herein, such as shown in FIG. 1. In some embodiments, media content data corresponds to published periodical data sets (e.g., issues) each having a plurality of article data sets (e.g., articles in each issue). Each article data set corresponds to at least one page of media content, such as with an article pertaining to multiple sequential pages of media content. Blocks of reformatted media content are stored for each periodical data set and used to facilitate the delivery of stored media content to respective devices. In this content, subsets of blocks may be resent to respective devices if delivery problems occur, and can be effected in an out-of-order sequence.

In review of the above, various embodiments involving one or more aspects as shown in FIG. 1 are implemented for formatting data according to display formats specific to each of the disparate content providers, for media content provided by the content providers, to comply with formatting criteria defining iterative placement of different sets of advertising image data with a single content image data for display via the electronic interfaces for the plurality of disparate devices. The iterative placement corresponds to at least one of: replacing a first set of advertising data with a second set of advertising data in a corresponding portion of the single content image, displaying different sets of advertising data for different instances in which the content is provided, and displaying different sets of advertising data to different users accessing the same single content image and at the same location within the image as displayed at the respective devices.

These approaches are carried out, for example, using periodical content having a plurality of static images respectively corresponding to a page within the periodical and having regions including text and regions for displaying advertising information. In such an embodiment, the media content formatter 110 formats each static image to be displayed on different devices having different display sizes and operating using different processing characteristics, with text and advertising regions defined by the formatting criteria for the publisher providing the media content and the specific formatting type.

In some embodiments, the system 100 includes the entitlement module 170, which is responsive to user inputs requesting media content in the user-specific storefront to which the user does not have subscription access. The entitlement module 170 generates and stores entitlement data that is accessible by the second filter 142 and that assesses valuation data to the user for the providing subscription access. In such applications, the interface module 160 is responsive to the entitlement module 170 by facilitating delivery of the requested media content to the device.

One or more aspects of FIG. 1 may be carried out in connection with other figures, such as with host systems as shown and described in connection with the presentation of media content. In addition, certain embodiments are directed to apparatuses and/or systems also including reader device applications that interface with the apparatus 100, and related aspects, such as those described in the above-referenced patent applications having Ser. No. 13/439,665 (e.g., with respect to the provision of thumbnail-type data) and/or Ser. No. 13/415,157 (e.g., with respect to apportioning user metrics relating to content access).

Other example embodiments, as may be implemented using one or more apparatuses and/or systems as discussed herein, are directed to methods for presenting and facilitating access to media content from disparate content providers and in disparate formats, at user devices having different format type criteria. For instance, one or more of the above-discussed approaches involving one or more apparatuses in FIG. 1 are carried out as method-based embodiments which may be effected using different types of devices, in accordance with the other embodiments. Different types of media content from the disparate content providers are formatted into one or more common format types based upon formatting criteria defined for each of the disparate content providers. Each common formatting type corresponds to specific electronic interface characteristics for one of a plurality of disparate device types via which the media content is to be presented in one of the common format types. Media content access is filtered based upon characteristics of a device to which the access is provided, upon stored time-based subscription data for a user identification associated with a content access request, and upon access criteria specific to each of the disparate content providers for which the media content is provided.

For each of a multitude of users each having a unique one of the user identifications, a user-specific storefront interface is generated using the first, second and third filters. Each storefront interface indicates media content that is available for access by the user based upon characteristics of the device via which the user is to access the media content, subscription data for the user and criteria set by the respective content providers for the respective media content. The resulting storefront interface identifies media content to which the user has subscription access and media content to which the user does not have subscription access.

In response to requests for accessing media content received from a multitude of disparate devices, data in the request is presented to facilitate the identification of a user identification for each user, for filtering the media content access based upon the stored time-based subscription data. Data for presenting the user-specific storefront interface is communicated to the user device, and for user-selections made via the user-specific storefront interface, stored media content is delivered to the device.

The filters may be used, for example, as part of a system that operates to identify data to be accessed. In some embodiments, the filters are used together to generate user-specific storefront interfaces that display media content from a content catalog that each user device is capable of displaying, that the respective content providers providing the content allow to be displayed on the respective types of the user devices, and that visually identifies content (for each user/device) to which the user has subscription entitlement and content to which the user does not have subscription entitlement. Such visual identification may, for example, include highlighting or labeling image data corresponding to a media content set that can be selected by the user for access.

Figure 2:
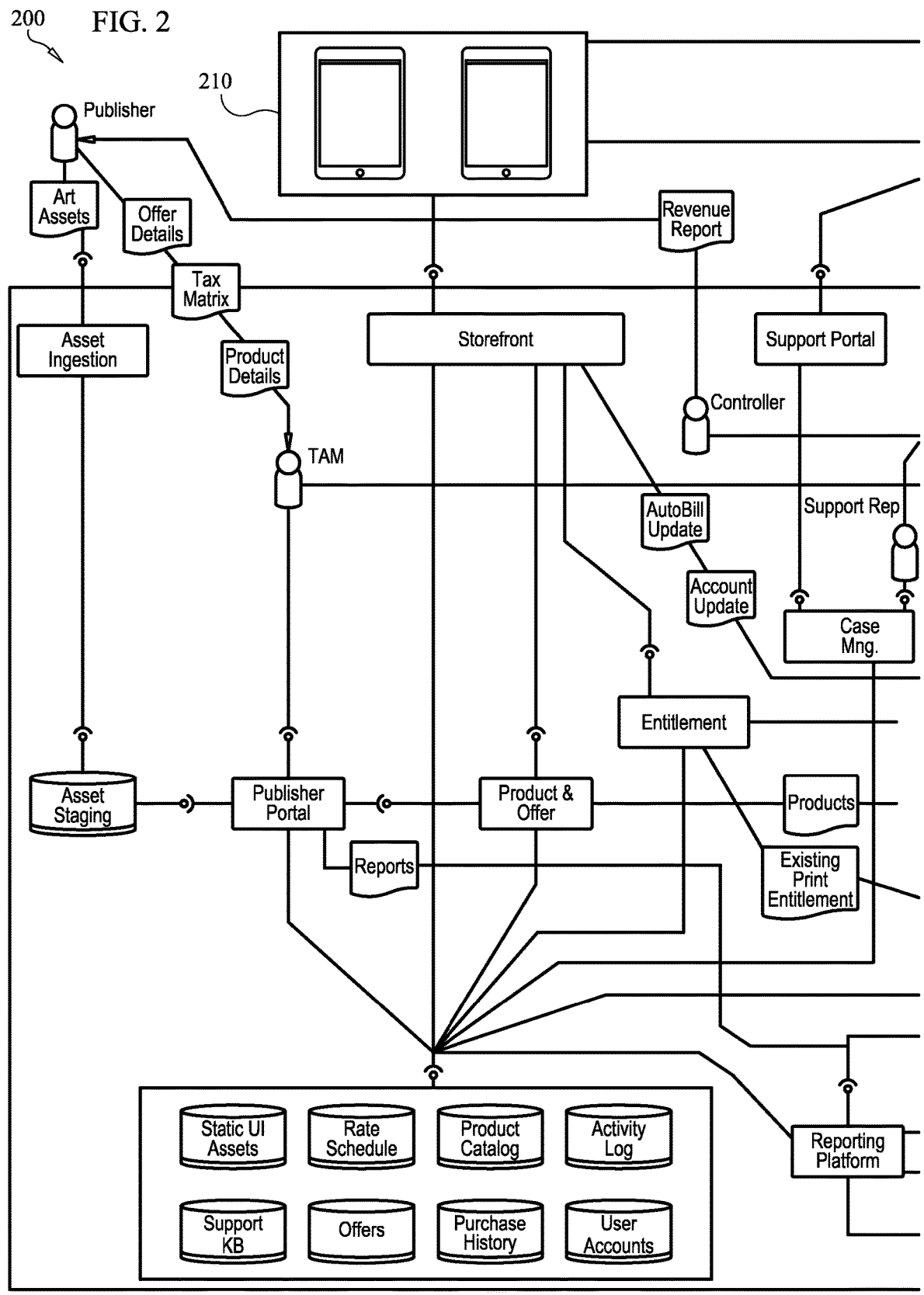
FIG. 2 shows a system for presenting media content for access, and coordinating the delivery thereof, in accordance with one or more example embodiments.
Figure 3:
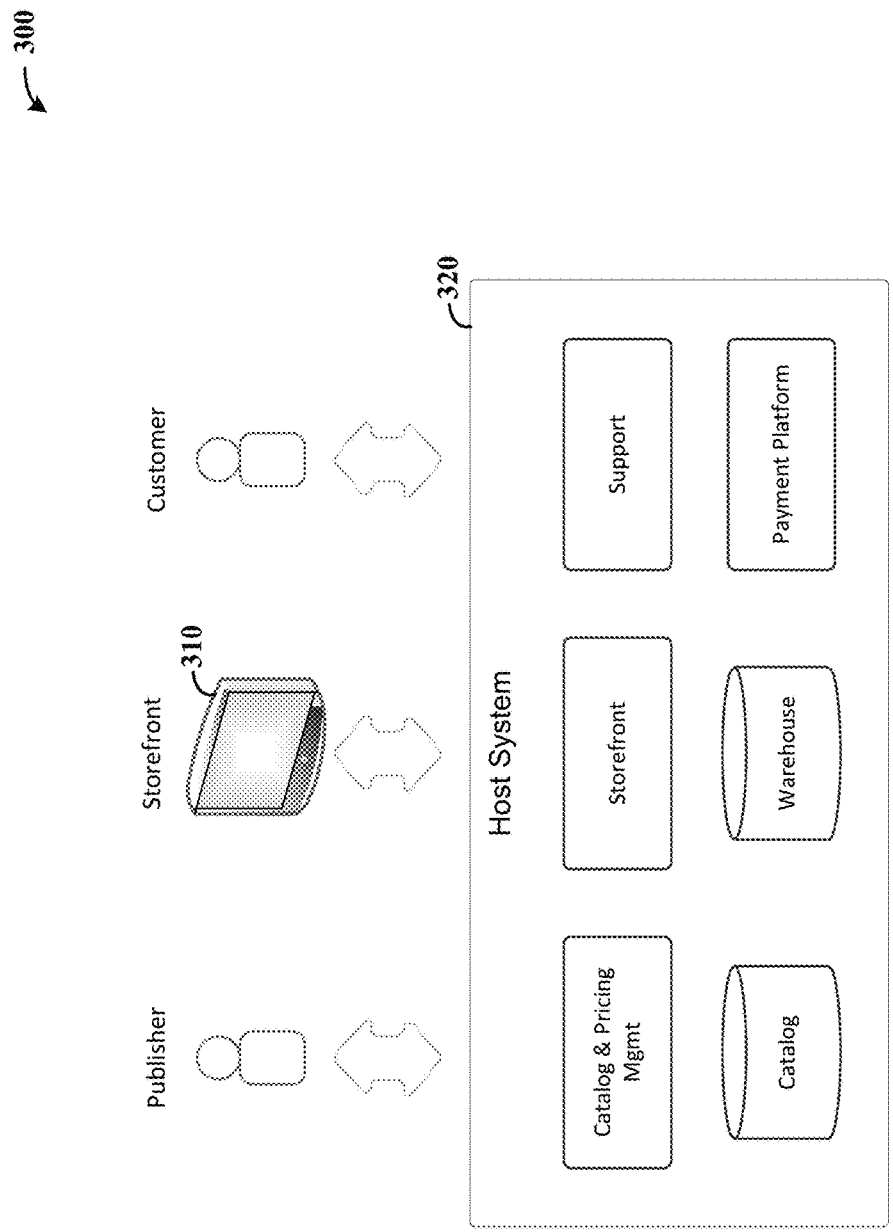
FIG. 3 shows an apparatus for effecting catalog, pricing management, storefront, support functionality, payment platform, data warehouse, and product catalog functions as may be implemented in accordance with one or more example embodiments.
Figure 4:
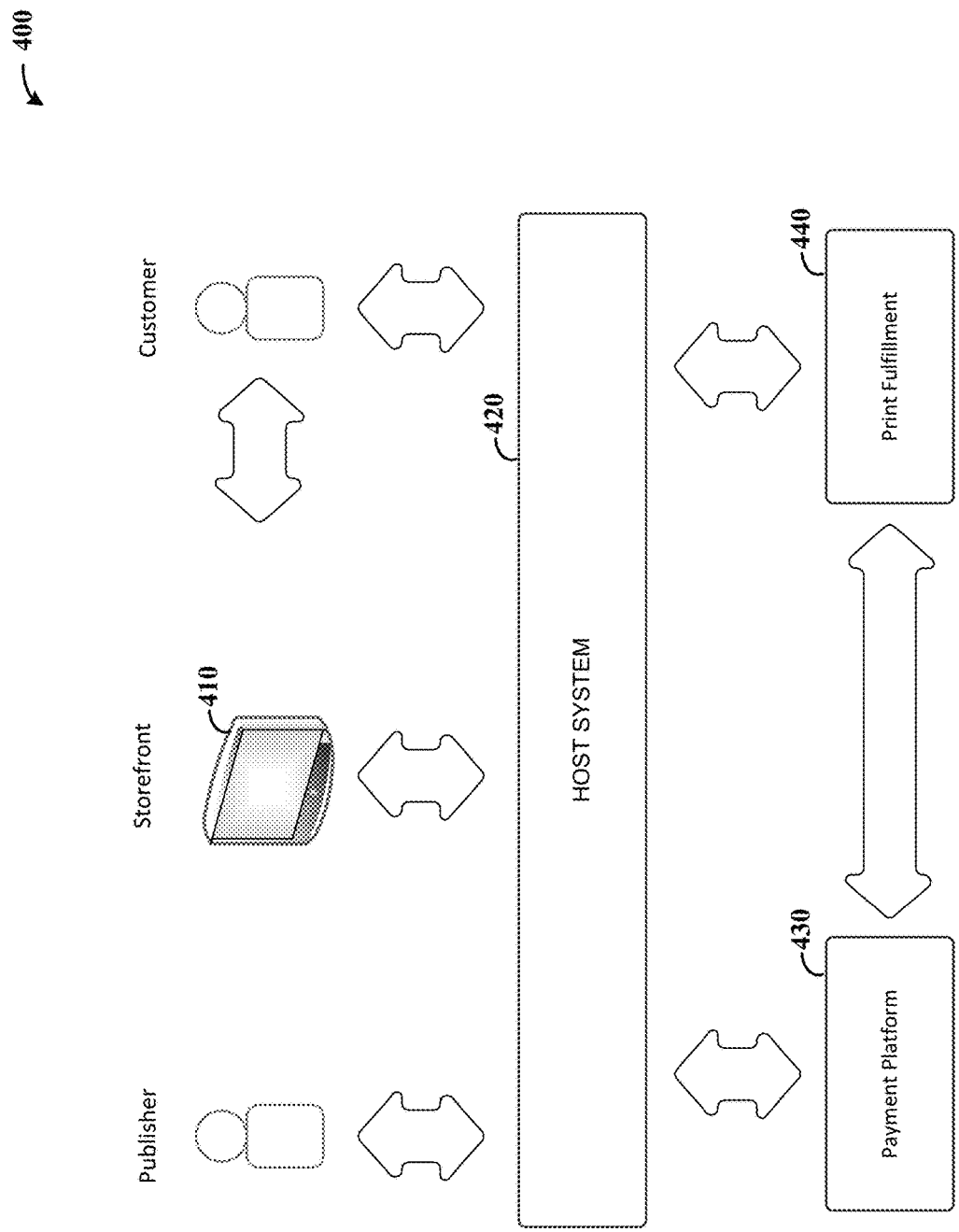
FIG. 4 shows an apparatus and system, in accordance with one or more example embodiments.

FIG. 2 shows a system 200 for presenting media content for access at a multitude of user devices, and coordinating the delivery thereof, in accordance with one or more example embodiments. FIG. 3 shows a high-level overview 300 of such a system, and FIG. 4 shows a high-level overview of a fulfillment portion 400 of such a system. Referring to FIG. 2, a single user device 210 is shown by way of example, and to which access is provided. A host system 220 implements various functional blocks as shown, which can be provided via logic circuits and in accordance with network communications. For instance, the various functional blocks are implemented as software that is executed on one or more networked processors, or implemented on separate processors respectively carrying out different functions (e.g., different processors on a network and/or with processors in an end device operated by a user for accessing content). Data flow between functional blocks may be effected in various manners as well. In addition, various aspects of FIG. 1 may be implemented using one or more approaches as described herein, and shown in the other figures (e.g., with corresponding aspects therein).

The host system 220 interacts with a financial system 230 that includes a payment platform and other functions for providing payment (e.g., software and service). This side handles payment functions such as those involving credit cards and recurring billing. Generally, payment data such as credit card data is passed from users directly to the financial system, and can be communicated without passing the information through the host system.

Blocks at 232 are print fulfillment houses that are accessed for determining a user's entitlement to access particular content. For example, these blocks may verify user identification data and associate a media content access level (e.g., subscription or subscriptions, or subscription level) with the users. For example, if a user is a subscriber to a print or physical version of media content, access to digital/streaming type of versions can be granted accordingly. Similarly, if a user subscribes digitally, a communication may be sent to initiate a delivery of a print of physical version of content to the user. The fulfillment house connector can be implemented as an abstraction layer between the host system and a fulfillment house.

A web analytics module 240 analyzes data for a variety of purposes, such as for monitoring user access and trends, tailoring content for the user, updating access features and feature sets, and more. The business financials box monitors financial information and interacts via the ETL box for sending information to the host system.

Different interfaces may be displayed at various user devices (represented by 210). For example, a single title reader and a discovery application can be presented as part of a storefront. These two functions can be integrated in a common application, or provided separately. Other views of such a reader and discovery application that can be implemented with these embodiments are shown in the Appendix in the above-referenced provisional patent application. In some implementations, the storefront, the product and offer, entitlement, pieces, are bundled up into one component. The support representative, TaM, controller and NIM Marketing components can be implemented automatically and/or with a person interacting with the system. The support rep communicates with customers/customer systems, and interacts with a case management block.

At the top left, a publisher/publisher system provides data for each issue and title that the publisher wants to sell/provide, such as content data, details about the product, metadata about the product, tax information (e.g., where tax needs to be charged when they sell goods/services), and offer details (e.g., prices). This can be effected via a publisher portal system, or directly via human interaction. The publisher pushes appropriate information into a database at the host system, which stores different types of data pertaining to particular types of media content for various publishers. This approach may be implemented, for example, in connection with a reformatting approach as discussed in FIG. 1.

A support portal includes an API and is configured with business logic behind the store, which can be implemented in different manners. In one implementation, a boot strap server is responsive to single title type of reader or discovery app user interface (UI) requests from a storefront, and determines what kind of UI applies to a particular discovery app, relative to a single title reader that is provided with a different type of UI.

The outbound email processing takes e-mail from the payment platform and other e-mail generated, may brand the email, and sends it to a consumer. The merchant portal provides insight into billing transactions, such as credit card transaction information. The hosted order automation (HOA) block, which can be implemented in an integrated or stand-alone manner, facilitates the flow of certain payment information such as credit card information directly from the application to a payment provider. The financial system interacts with a payment gateway, that interacts with various financial institutions, clearing houses and so forth. Payments are authorized in response to information received via the payment gateway (e.g., to verify funds). Charge backs and some failures are also processed via the gateway.

The ETL block can be implemented as a series of batch processes, and takes all the financial transaction information out of the payment platform, massages it as whatever data needs, and pushes that up into the business financials reporting engine. Reports on this data can be run and provided to publishers for either remittance or a bill.

A static image server stores static images so that the storefront, which has logic in it, isn't burdened by just serving.

An asset ingestion block takes in asset information and, where appropriate, formats the asset information for access.

In some implementations, a search function is implemented off of the asset ingestion block. Content is indexed, with indexing information stored in the database to facilitate searching across content.

FIG. 3 shows an apparatus 300 for effecting catalog, pricing management, storefront, support functionality, payment platform, data warehouse, and product catalog functions as may be implemented in accordance with one or more example embodiments. The apparatus 300 may be implemented, for example, in accordance with FIG. 1, FIG. 2 or otherwise. The storefront effectively provides a user interface type of system that facilitates a user's access at a device 310 both to media content that the user has rights for, and to content that the user can purchase. Each publisher communicates with a host system 320, which generates a storefront, a discovery application and a single title store, for the display of the presentation layer of a storefront for content provided by the publisher. The system 300 facilitates customer interaction with customer support.

FIG. 4 shows an apparatus and system 400, in accordance with one or more example embodiments, in which content access is provided at a user device 410 via a host system 420. An inbox is collapsed into a single box, with a payment platform 430 and print fulfillment block 440 optionally implemented externally from the host system 420. In some implementations, the payment platform interacts with the print fulfillment block, and in other implementations, appropriate communications are made via the host system.

Figure 5:
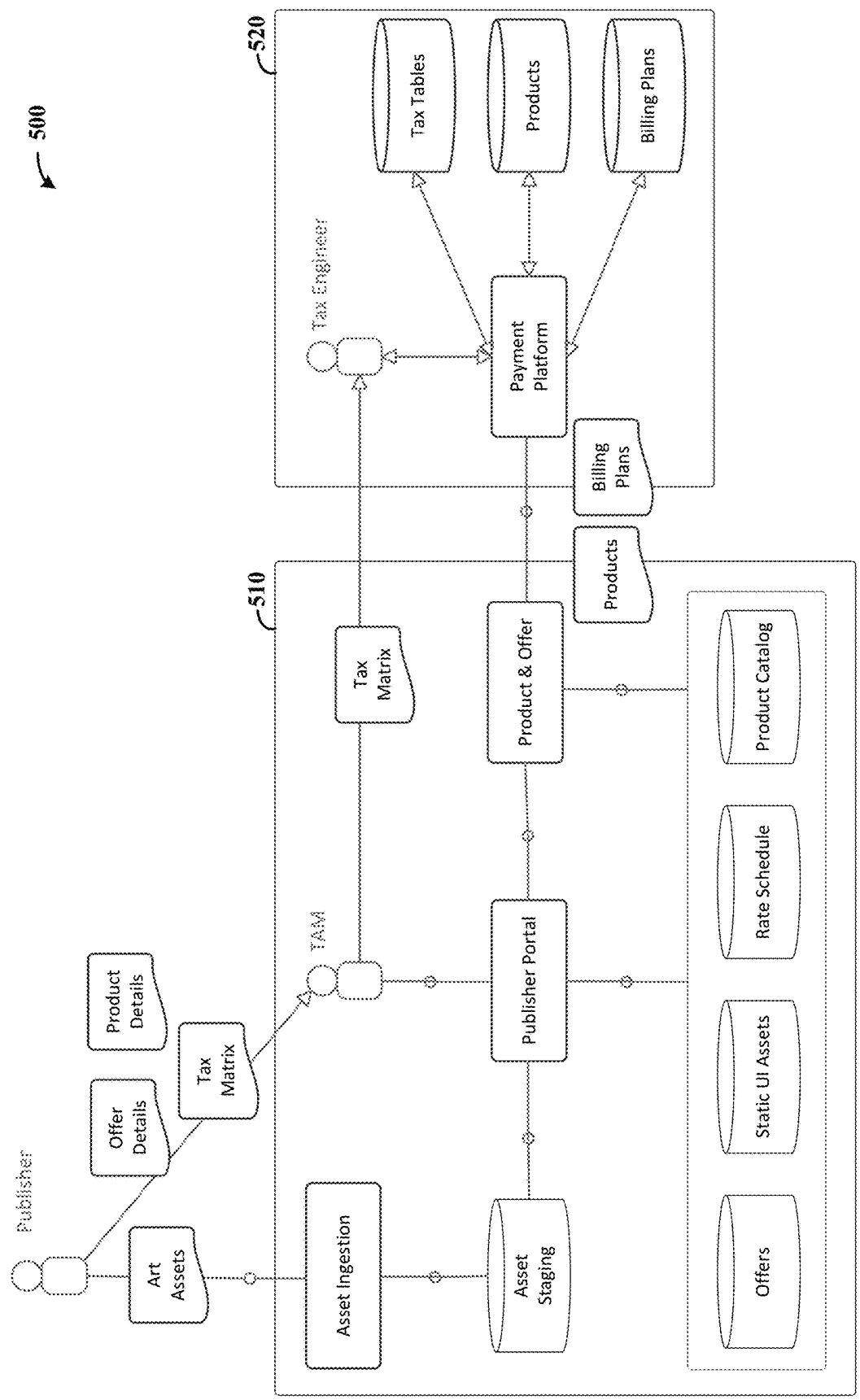
FIG. 5 shows an apparatus and approach for effecting interaction between components at a host system, a payment platform and a publisher, in accordance with one or more example embodiments.

FIG. 5 shows an apparatus 500 and approach for effecting interaction between components at a host system 510, a payment platform 520 and a publisher, in accordance with one or more example embodiments. Communications are facilitated to set up a publisher, to provide data for delivering (and selling, where appropriate) content through a storefront. The publisher also provides new issues or added titles to the store. The publisher also provides tax matrix information that the host system uses for charging an end user an appropriate tax rate for what they are purchasing. This information is further used in an interaction between a technical account manager and a tax engineer at the payment platform, with the interactions being manual (e.g., human) and/or automated. The tax matrix is validated by a controller, such as by running sample transactions and they make sure that the taxes are being calculated appropriately.

When a publisher wants to add a title, such as when a publisher provides titles A, B and C, is currently using only A and B and wants to add C, the publisher provides information such as art assets and metadata about the content (e.g., magazine). Art assets are things like a logo for the title, and metadata can include descriptive information about various aspects of that title, and that text is displayed to the user. Accordingly, if the user is looking at a list of titles in the store, they'll see their title, in this case Title C, with a textual description next to it. Where applicable, codes such as magazine codes are associated with each title, with the publisher providing data indicating what magazine code matches the title, as well as what fulfillment house handles print fulfillment for the title.

From a digital upgrade perspective, if a publisher wants to offer a digital upgrade to a customer, the print fulfillment house is queried to test that entitlement (where print fulfillment houses are used). The system identifies a title that the user is trying to get a digital upgrade for, maps that title to a print fulfillment house and a magazine code, and queries the appropriate print fulfillment house. Accordingly, appropriate data is provided by or extracted from publishers to suit these functions.

The payment platform 520 is also populated upon the addition of a title, with a link formed between a product and offer and payment platform. Some portion of the product catalog is populated into the payment platform, as well as data for billing functions. Billing plans may be implemented for various access/subscription types, such as for a single issue purchase, a six-month subscription, or an annual subscription, which may involve one-time, monthly or other billing, and can further involve incentives such as price breaks for volume. Correspondingly, such subscriptions can be time-based. Further, certain approaches are directed to the termination of a subscription, in which payments are terminated and/or refunds are provided as may be appropriate. These functions can be carried out at the payment platform. Billing plans can be generated from offer details that come from the publisher. Accordingly, when a title is added one or more sets of data pertaining to offer details is obtained/established, such as data pertaining to what kind of offers will be presented to users for purchasing access to content, with various prices associated with the content, such as those described above. When something is purchased, it is associated with a billing plan that the payment platform uses for billing. Changes in pricing, offers and other characteristics are made as they are received.

In addition to metadata and graphics that are used for certain types of media content, additional information is received and used for each particular content item that is offered. For example, when a new issue comes out, such as a new month's issue for a magazine, assets for that particular issue are obtained and used in providing the media content (e.g., preview information such as a thumbnail of the cover and/or table of contents may be offered to entice a sale). For instance, a UI can show covers of various magazines and, when the cover of a particular magazine is clicked on or rolled over, the UI transitions the cover to a table of contents view. This content may be provided at the host system, or via some other system to which a link is made.

In various aspects, the host system 510 then takes on art assets, offer details and product details, and uses those to populate a product catalog, rate schedule, and static UI assets. Static UI assets would be images and other media (e.g., a short video clip). Some of the aforesaid information is presented to a payment platform.

Figure 6:
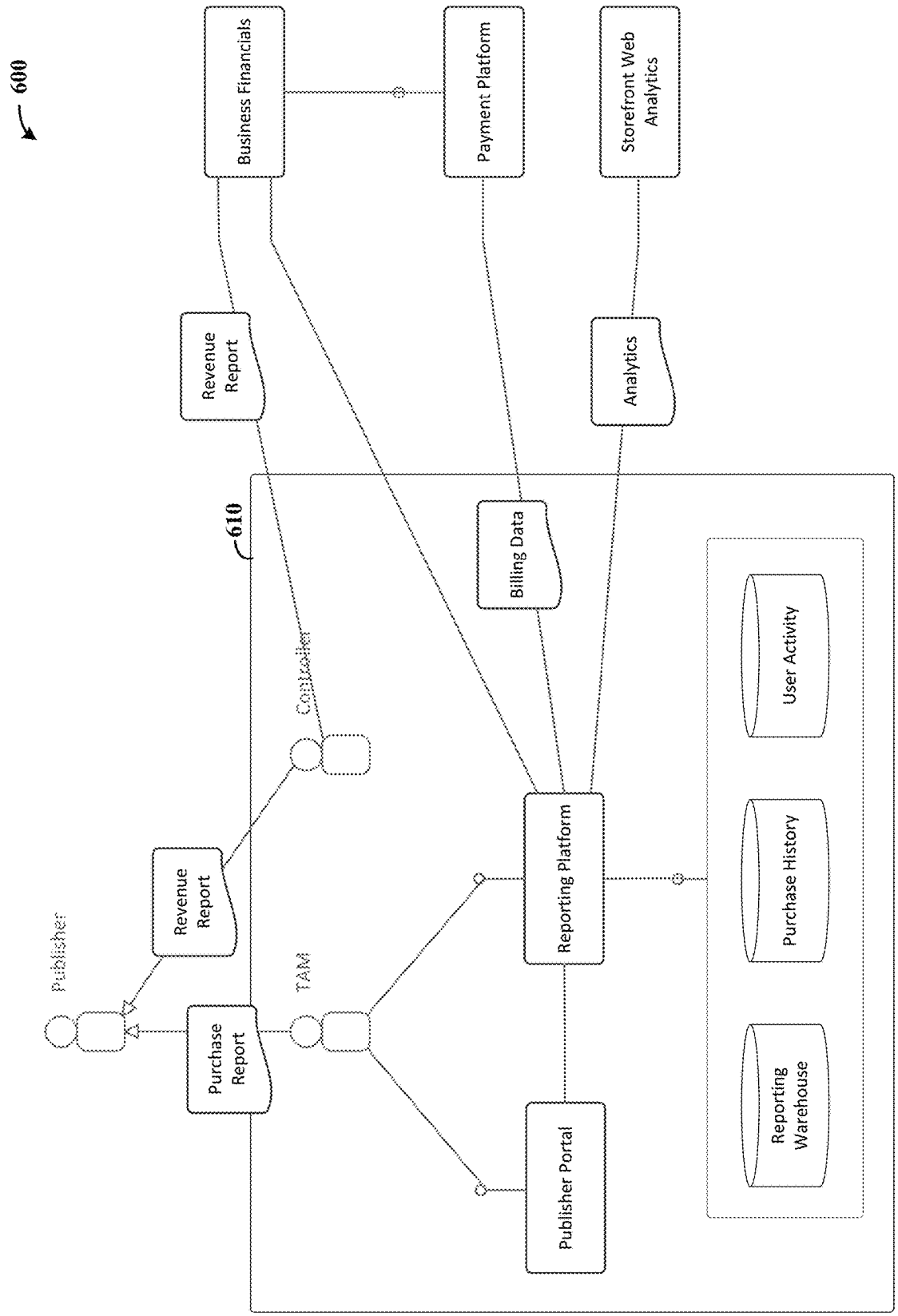
FIG. 6 shows an apparatus and approach for effecting reporting functions as may be carried out in accordance with one or more example embodiments.

FIG. 6 shows an apparatus 600 and approach for effecting reporting functions as may be carried out in accordance with one or more example embodiments. The apparatus 600 includes a host system 610 having a reporting platform, which may be removed and replaced with an ETL or batch process function to carry out communications (in and out), to pull data from a payment platform, massage it and push it up into a business financial system. Revenue reports are generated by a controller, and sent back to the publisher with either a check or a bill depending on which way sales go. The purchase report coming from the TAM to the publisher may be omitted, and drawn out of a reporting platform and a publishing portal. Various data mining as shown may be carried out using web analytics.

Figure 7:
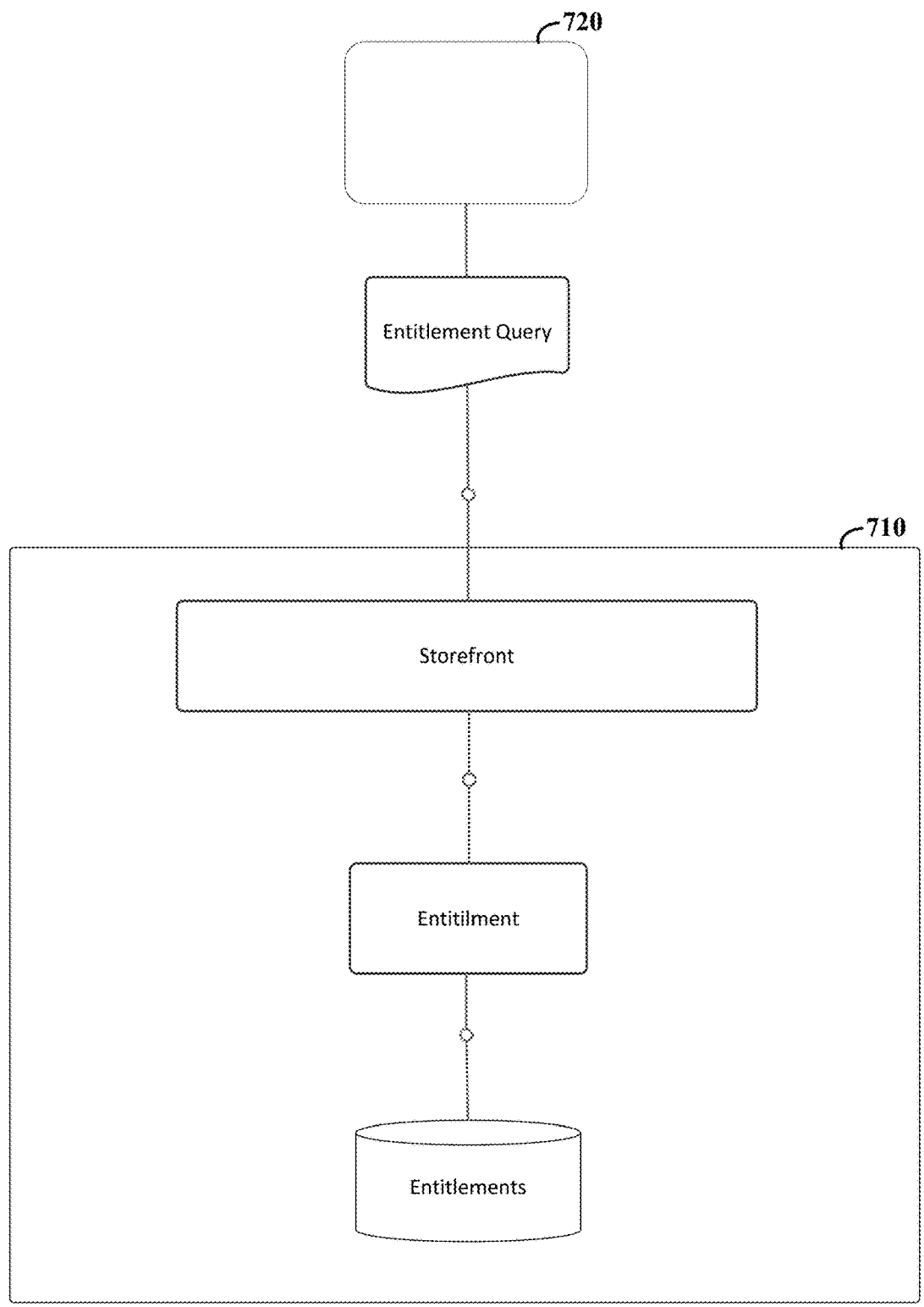
FIG. 7 shows an apparatus and approach for effecting entitlement functions, in accordance with one or more example embodiments.

FIG. 7 shows an apparatus 700 and approach for effecting entitlement functions, in accordance with one or more example embodiments. The apparatus 700 includes a host 710 the provides access to a user device 720 (and a multitude of such devices, e.g., implementing a discovery application). The shown flow and connections are exemplary, with other approaches applicable. The host 710 includes storefront and entitlement components as well as a database that stores entitlement data. For a user wishing to download content, the user's entitlement is verified by presenting a query to a storefront, which checks the entitlements on its system via the database to determine whether the user can access the desired content.

In various implementations, an entitlement query goes from a single title application, as shown, to a content delivery system and distribution system. The single title reader is programmed to talk to a back end system for the particular content, with the content delivery system acting as a corresponding back end. When an application at device 720 requests content for downloading (e.g., in response to a user input), a content delivery system is queried to determine whether the user has permission to access the content. The content delivery system supports an API and/or external systems to provide entitlement data, with content delivery systems of participating publishers being set up so they query the host system for entitlement data. Thus, the request goes from the reader to the content delivery system, and the content delivery system then turns around and makes the entitlement query to the host system. The content delivery system looks up where the content is so it can be provided or cached appropriately. The content delivery system returns an appropriate URL to the reader so content is accessed and pulled down.

Entitlements are also parsed to display a storefront (e.g., via a mobile device), so that a user is able to see issues that he or she has purchased, as well as those he or she has not purchased, or other entitlement information. For instance, magazine issues that haven't been purchased can be displayed with a "buy" button, and issues that have been purchased can be displayed with a "download" button.

Figure 8:
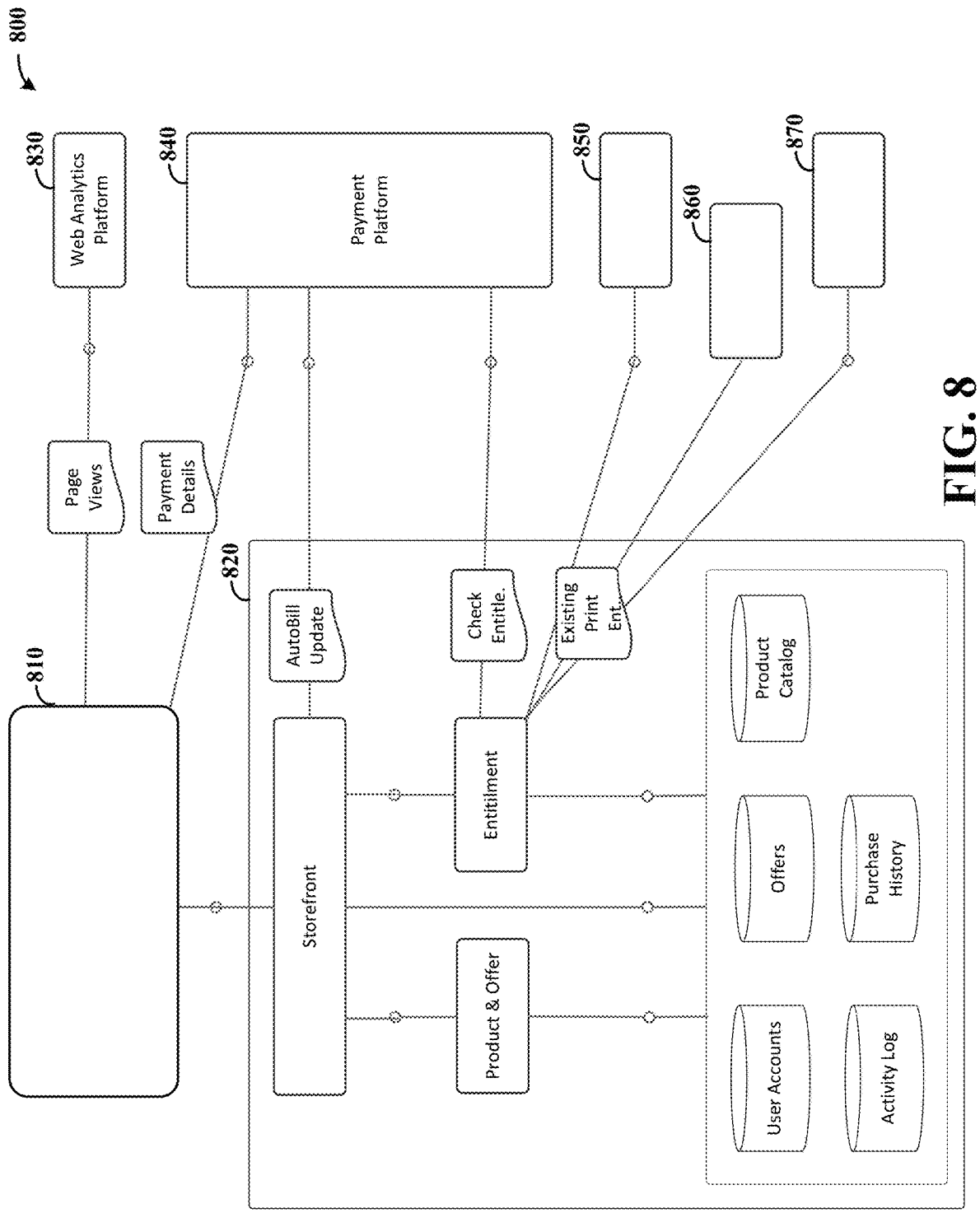
FIG. 8 shows an apparatus for presentation of a storefront for a reader device, in accordance with other example embodiments.

FIG. 8 shows an apparatus 800 for presentation of and interaction with a storefront for a reader device, in accordance with other example embodiments. The apparatus 800 facilitates interaction between a reader at a user device 810 and other components in a content system including a host 820, using an API with various calls such as log in, log out, access requests, data for building the storefront such as a request for current issues, current offer prices, back issues, and others that a user may browse. When a user navigates a storefront, analytics data is recorded at 830 and used for tailoring the store for a user or users.

When a user goes to make a purchase, the store lets the storefront know that a purchase flow function is entered. The storefront communicates with a payment platform 840 to alert the platform to incoming information, and the payment platform returns an ID for that transaction that's about to happen. A web form that contains that ID as a hidden field is created and served back to the device where it is presented to the user entering payment information, which is submitted back to the payment platform. The payment platform then redirects the user back to the host server, to a URL that has been provided (e.g., one for success and one for failure). The transaction ID is used to query the payment platform for whether the transaction was a success or failure, on one or more levels. An auto-bill update function may be implemented to set up and commit a particular transaction. Entitlement is carried out in a manner such as described herein, via one or more print fulfillment houses 850, 860 and 870 (shown by way of example).

In addition to the shown components in FIG. 8, certain embodiments implement a store load function as a boot strap program or server that is first accessed by a user's device to load a storefront. The boot strap program/server returns HTML and JavaScript back to the device requesting access. The HTML and JavaScript turns around and makes Ajax calls to the storefront.

Figure 9:
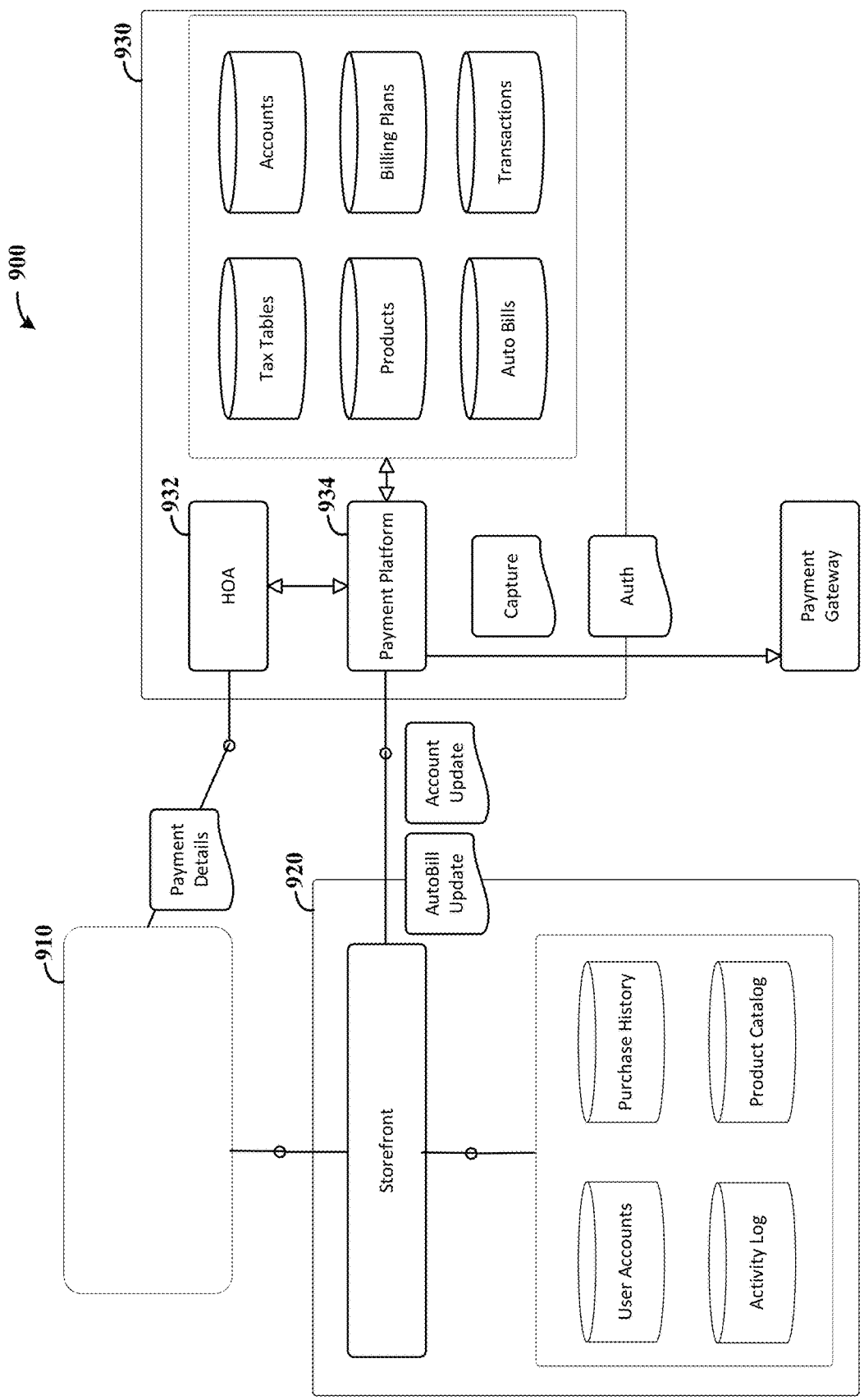
FIG. 9 shows an apparatus and approach for purchase aspects of content provision, in accordance with one or more example embodiments.

FIG. 9 shows an apparatus 900 and approach for purchase aspects of content provision, in accordance with one or more example embodiments. The apparatus 900 operates to provide media content to a user device 910, via a host 920 and facilitated by a financial system 930 (internal or external). Hosted order automation/activity (HOA) module 932 sends the content through the form to a financial system, which can be used to alleviate the processing of financial data in the host system 920. A payment platform module 934 communicates to the payment gateway, to facilitate purchases.

The systems and functions shown in the Figures and described above in connection with the figures, in the figures in the above-referenced patent documents to which priority is claims, and otherwise can be implemented in a variety of manners. In some implementations, shopping sites are integrated with media delivery, to provide access to shopping functions together with related media content. For instance, where a fashion magazine type of media content is provided, advertising included with the media content can be linked to fashion-based shopping sites, or to other sites often visited by those viewing the fashion magazine.

In some implementations, media content is provided with advertisements that are based upon information for the user, either as obtained via usage patterns and/or via the user's profile as may be stored with a host system. Further, this advertisement may be tailored to fit with a particular type of media content, such as by coupling or embedding advertising within predefined portions of media. One such implementation is directed to the display of advertisements within a magazine that is provided to a user via the display of an electronic device. The magazine contents are arranged in a predefined pattern, or in a pattern set according to certain rules (e.g., set by the publisher for desirable display of information), with other image regions reserved for display of advertising. Advertising may be presented in these other image regions by fitting the advertisements to available space and further selecting the advertisements based on one or more of the available space (e.g., and advertiser requirements), user information, user location (e.g., as obtained via a user's mobile device) and media content type. For instance, the advertising may be tailored to the user's proximity to a particular retail outlet, such as by displaying an advertisement for coffee when the user is reading a magazine near a coffee shop.

In some implementations, advertisements presented with a particular set of media content, such as a digital magazine, are inserted by host system. Advertising entities contract with the host system for displaying information. Media content providers may specify when, how or the type of advertising that can be displayed. The host system uses this information together with information about the user to generate and display advertising in an embedded type of manner. For instance, when a user subscribes to a particular magazine, the publisher may specify a manner in which its articles are to be provided for reading by the user, with agreed-upon advertising space (e.g., standard advertising sizes and locations, or specific locations and sizes). The host system then fills these advertising spaces with advertisements for the advertising entities, charges a fee to the advertising entities and passes a portion of the fee on to the publisher.

Using this approach, the publisher is freed from any need to interact with advertisers, and the advertisers can then access advertising needs across different titles and different publishers. For example, if a particular chain of restaurants is local to a single city or a limited number of cities, that restaurant may purchase advertising based upon user profile information (e.g., trending) as well as geographical location, rather than advertise in a single title or issue. This trending may involve, for example, the user's use of a reader application as well as location history. Date and time data may also be used to further tailor advertising information, such as to advertise a daily special, a particular event, or a time-based advertisement. In this context, local advertising can be provided to wide-scale publications. An advertisement processing engine implemented with the host system can accordingly take in various data types, such as user profiles, publisher profiles, advertiser profiles, geographic information and time information, process the information and provide a tailored advertising package. The collective ability to advertise in magazine space differently in different regions, for different users, at different times and on different dates can be used to target advertising more closely to an expected use.

A more particular embodiment is directed to displaying information for products that are alternative products, or available from alternative sources, relative to a product as shown/advertised. For example, if an article is displaying goods, such as fashion or automotive goods, information regarding similar products available for purchase can be provided to the user.

When a user accesses information, the information can be provided in one or more of a variety of manners. For example, when a subscriber accesses a digital magazine, the access may involve downloading information on an article-by-article basis, to a subset of articles, to articles across issues, or to an entire issue or issues. Users may execute a clip function to save a clipped article from a particular issue on a user device.

Various modules may be implemented to carry out one or more of the operations and activities described herein and/or shown in the figures. In these contexts, a "module" is a circuit that carries out one or more of these or related operations/activities (e.g., filtering, generating user-specific interfaces, communicating or otherwise presenting data). For example, in certain of the above-discussed embodiments, one or more modules are discrete logic circuits or programmable logic circuits configured and arranged for implementing these operations/activities, as in the modules shown in the Figures (see, e.g., FIGS. 1 and 2). In certain embodiments, programmable circuits or modules as discussed herein include one or more computer circuits programmed to execute a set (or sets) of instructions (and/or configuration data). The instructions (and/or configuration data) can be in the form of firmware or software stored in and accessible from a memory (circuit). In one example, respective modules include a combination of a CPU hardware-based circuit and a set of instructions in the form of firmware, where a first module includes a first CPU hardware circuit with one set of instructions and a second module includes a second CPU hardware circuit with another set of instructions. Other circuit-based applications, such as host devices and reader applications, may also be carried out using such modules or computer circuits.

Certain embodiments are directed to a computer program product (e.g., nonvolatile memory device), which includes a machine or computer-readable medium having stored thereon instructions which may be executed by a computer (or other electronic device) to perform these operations/activities. Such a product may be implemented, for example, in an application-type environment operating on a user's mobile device.

Various embodiments described above, in the above patent documents to which priority is claimed, and shown in the figures may be implemented together and/or in other manners. One or more of the items depicted in the drawings/figures and/or the above-referenced patent applications to which benefit is claimed can also be implemented in a more separated or integrated manner, or removed and/or rendered as inoperable in certain cases, as is useful in accordance with particular applications. In view of the description herein, those skilled in the art will recognize that many changes may be made thereto without departing from the spirit and scope of the present disclosure.

What is claimed is:

1. An apparatus comprising:
a content formatter configured to:
receive, from a first content provider, a first piece of content having a first formatting type;
receive, from a second content provider different from the first content provider, a second piece of content having a second formatting type different than the first formatting type;
convert the first piece of content, by:
generating a first common formatted content having a first common formatting type designed for a first electronic circuitry corresponding to a first display having a first size; and
generating a second common formatted content having a second common formatting type designed for a second electronic circuitry corresponding to a second display having a second size different than the first size; and
convert the second piece of content, by:
generating a third common formatted content having the first common formatting type; and
generating a fourth common formatted content having the second common formatting type; and
an interface generation and formatting engine configured to:
identify generated common formatted content that is designed for the first electronic circuitry, the generated common formatted content comprising the first common formatted content and the third common formatted content;
identify content provider eligible content from the generated common formatted content by filtering from the generated common formatted content any generated common formatted content that is ineligible for offering via a first user interface based upon whether display formats of the common formatted content comply with formatting criteria set by the first or second content provider, wherein the formatting criteria defines text and advertising regions in the first and second formatting types; and
generate the first user interface, wherein the first user interface includes data that identifies the content provider eligible content,
wherein the content formatter and interface generation and formatting engine include at least one CPU hardware-based circuit that is programmed to format different types of media content and to generate and format the first user interface by executing respective sets of instructions.

2. The apparatus of claim 1, further including a plurality of filter modules, each filter module including circuitry programmed to carry out operations, the plurality of filter modules including:
a device-based filter module configured to filter the second and fourth common formatted content from the first, second, third, and fourth common formatted content based upon an electronic device upon which the first user interface is to be displayed being associated with the first electronic circuitry; and
a publisher-directed filter module configured to filter from the generated common formatted content any generated common formatted content that is ineligible for offering via the first user interface based upon criteria set by the corresponding content provider; and
wherein the interface generation and formatting engine is configured to generate and format the first user interface by interacting with the device-based and publisher-directed filter modules to respectively identify the generated common formatted content that is designed for the first electronic circuitry and identify the content provider eligible content.

3. The apparatus of claim 2, further including an entitlement management circuit module configured to respond to a request for accessing the first piece of content, received from a user via the first user interface, by:
providing access to the first common formatted content by the user in response to the user being permitted access to the first common formatted content;
operating with the interface generation and formatting engine to provide subscription update information to the user via the first user interface, in response to the user not being permitted to the first common formatted content; and
providing access to the first common formatted content in response to the user electing to update the user's subscription via provided subscription update information.

4. The apparatus of claim 1, wherein formatting criteria defines placement of advertising image data for display via the first electronic circuitry and the second electronic circuitry.

5. The apparatus of claim 1, wherein the first user interface is configured to provide or display media content that can be accessed via a device based upon the device having the first electronic circuitry.

6. The apparatus of claim 1, wherein the first user interface is configured to provide or display media content that can be accessed via a device for which a user of the device is entitled to have access as identified by subscription data for the user.

7. The apparatus of claim 1, wherein the first user interface is configured to provide or display media content that can be accessed via a device for which a user of the device is not entitled to have access.

8. The apparatus of claim 7, wherein additional media content, as available from content providers based upon criteria set by the content providers defining device types upon which the additional media content is not to be displayed, is not provided or displayed unless the device is identified as having satisfied a subscription entitlement condition.

9. The apparatus of claim 8, wherein a portion of the additional media content that can be accessed for which the user of the device is not entitled to have access corresponds to data from a catalog that the device is capable of displaying that visually identifies content for which the user has subscription entitlement and content to which the user does not have subscription entitlement.

10. The apparatus of claim 1, wherein the data of the first user interface comprises data that, when displayed via the first electronic circuitry:
visually identifies two different sets of media content respectively associated with different media content providers;

presents a delete option for one of the sets of media content; and
presents a download option for another of the sets of media content.

11. The apparatus of claim 1, configured to format at least a portion of the first or second piece of content corresponding to published periodical data sets, wherein each of the published periodical data sets has a plurality of article data sets, wherein each article data set of the plurality of article data sets corresponds to at least one page of media content, and the at least one page of media content includes a data set corresponding to at least one article and sequential pages of media content.

12. The apparatus of claim 1, wherein the first piece of content includes periodical content having a plurality of static images respectively corresponding to a page within the periodical content and having regions for displaying advertising information.

13. The apparatus of claim 1, wherein the first piece of content includes static images to be displayed on different devices having different display sizes and operating using different processing characteristics.

14. The apparatus of claim 1, comprising an interface module configured to transmit data that is configured to provide the first user interface at a display of a device, wherein the device comprises the first electronic circuitry.

15. The apparatus of claim 1, wherein the first user interface identifies at least one of the first, second, third, and fourth common formatted content to which a user is not permitted access.

16. The apparatus of claim 1, wherein the formatting criteria defines that the first piece of content cannot be provided to a device having the first electronic circuitry.

17. The apparatus of claim 1, wherein the formatting criteria defines that the first piece of content cannot be provided to a device based on a size of a display associated with the device.

18. An apparatus comprising:
a content formatter configured to:
receive, from a first content provider, a first piece of content having a first formatting type;
receive, from a second content provider different from the first content provider, a second piece of content having a second formatting type different than the first formatting type;
convert the first piece of content, by:
generating a first common formatted content having a first common formatting type designed for a first electronic circuitry corresponding to a first display having a first size; and
generating a second common formatted content having a second common formatting type designed for a second electronic circuitry corresponding to a second display having a second size different than the first size; and
convert the second piece of content, by:
generating a third common formatted content having the first common formatting type; and
generating a fourth common formatted content having the second common formatting type; and
an interface generation and formatting engine configured to:
identify generated common formatted content that is designed for the first electronic circuitry, the generated common formatted content comprising the first common formatted content and the third common formatted content;

identify content provider eligible content from the generated common formatted content by filtering from the generated common formatted content any generated common formatted content that is ineligible for offering via a first user interface based upon whether display formats of the common formatted content comply with formatting criteria set by the first or second content provider; and
generate the first user interface, wherein the content formatter and interface generation and formatting engine include at least one CPU circuit that is programmed to format different types of media content and to generate and format the first user interface by executing respective sets of instructions, and the first user interface includes data that identifies the content provider eligible content; and
an interface module comprising circuitry configured to transmit data that provides the first user interface at a device having the first electronic circuitry, wherein the content provider eligible content comprises text and advertising regions defined by the formatting criteria.

19. A method comprising:
receiving, at a content formatter and from a first content provider, a first piece of content having a first formatting type;
receiving, at the content formatter and from a second content provider different from the first content provider, a second piece of content having a second formatting type different than the first formatting type;
converting the first piece of content, by:
generating a first common formatted content having a first common formatting type designed for a first electronic circuitry corresponding to a first display having a first size;
generating a second common formatted content having a second common formatting type designed for a second electronic circuitry corresponding to a second display having a second size different than the first size;
converting the second piece of content, by:
generating a third common formatted content having the first common formatting type; and
generating a fourth common formatted content having the second common formatting type; and
providing a first user interface designed for the first electronic circuitry, by:
identifying generated common formatted content that is designed for the first electronic circuitry, the generated common formatted content comprising the first common formatted content and the third common formatted content;
identifying content provider eligible content from the generated common formatted content, by filtering from the generated common formatted content any generated common formatted content that is ineligible for offering via the first user interface based upon whether display formats of the common formatted content comply with formatting criteria set by the first or second content provider, wherein the content provider eligible content comprises text and advertising regions defined by the formatting criteria; and
generating and providing the first user interface with an offering of the content provider eligible content.

20. The method of claim 19, wherein:
the first display is associated with a first type of electronic device;
the second display is associated with a second type of electronic device; and
identifying the generated common formatted content that is designed for the first electronic circuitry comprises determining whether common formatted content is capable of being displayed via the first display.

* * * * *